United States Patent
Wang et al.

(10) Patent No.: US 10,089,553 B1
(45) Date of Patent: Oct. 2, 2018

(54) METHOD, DEVICE, SYSTEM, AND STORAGE MEDIUM FOR AUTOMATICALLY EXTRACTING A VALIDITY PERIOD OF A DRIVING LICENSE

(71) Applicant: PING AN TECHNOLOGY (SHENZHEN) CO., LTD., Shenzhen (CN)

(72) Inventors: Jianzong Wang, Shenzhen (CN); Ming Liu, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 15/737,319

(22) PCT Filed: Feb. 28, 2017

(86) PCT No.: PCT/CN2017/075282
§ 371 (c)(1),
(2) Date: Jun. 2, 2018

(87) PCT Pub. No.: WO2017/148377
PCT Pub. Date: Sep. 8, 2017

(30) Foreign Application Priority Data

Mar. 2, 2016 (CN) .......................... 2016 1 0119474

(51) Int. Cl.
*G06K 9/46* (2006.01)
*G06K 9/20* (2006.01)
(Continued)

(52) U.S. Cl.
CPC ....... *G06K 9/4604* (2013.01); *G06K 9/00456* (2013.01); *G06K 9/2054* (2013.01);
(Continued)

(58) Field of Classification Search
CPC ............ G06K 9/4604; G06K 9/00456; G06K 9/2054; G06K 9/66
See application file for complete search history.

(56) References Cited

U.S. PATENT DOCUMENTS 9,208,619 B1 * 12/2015 Nerayoff ................ H04N 7/181
2009/0196512 A1 8/2009 Shelton et al.
(Continued)

FOREIGN PATENT DOCUMENTS

CN 102236782 A 11/2011
CN 102332119 A 1/2012
(Continued)

*Primary Examiner* — Ruiping Li
(74) *Attorney, Agent, or Firm* — Gokalp Bayramoglu

(57) ABSTRACT

A method of automatically extracting a validity period of a driving license is disclosed. The method include: extracting candidate contour regions in an image file of a vehicle driving license and selecting from among the candidate contour regions at least one containing an annual inspection validity period; extracting character contours in each selected candidate contour region; acquiring a smallest circumscribed rectangle of each character contour, and dividing the acquired smallest circumscribed rectangles into individual single-character blocks; sorting these single-character blocks according to their positions in the contour region; recognizing a corresponding character of each single-character block; generating a character string representing the annual inspection validity period using the recognized characters based on the sorting; and extracting and taking time data in the character string as the annual inspection validity period of the contour region. A device, system and storage medium to which the method is applicable are also disclosed.

20 Claims, 6 Drawing Sheets

(51) Int. Cl.
  *G06K 9/66* (2006.01)
  *G06N 3/04* (2006.01)
  *G06K 9/00* (2006.01)
  *G06N 3/08* (2006.01)

(52) U.S. Cl.
  CPC ............. *G06K 9/66* (2013.01); *G06N 3/0454* (2013.01); *G06K 2209/01* (2013.01); *G06N 3/08* (2013.01)

(56) References Cited

U.S. PATENT DOCUMENTS

2013/0290036 A1* 10/2013 Strange ................. G06Q 40/08
                                                          705/4
2016/0283787 A1*  9/2016 Nepomniachtchi ..........................
                                                          G06K 9/00442

FOREIGN PATENT DOCUMENTS

| CN | 103488998 A | 1/2014 |
| CN | 104298976 A | 1/2015 |
| CN | 104408449 A | 3/2015 |
| CN | 104700256 A | 6/2015 |
| CN | 105320952 A | 2/2016 |
| CN | 106156767 A | 11/2016 |

* cited by examiner

METHOD, DEVICE, SYSTEM, AND STORAGE MEDIUM FOR AUTOMATICALLY EXTRACTING A VALIDITY PERIOD OF A DRIVING LICENSE

CROSS REFERENCE OF RELATED APPLICATIONS

The present application is the national phase entry of international application no. PCT/CN2017/075282, filed on Feb. 28, 2017, which claims benefit of priority from Chinese Patent Application No. 201610119474.7, filed Mar. 2, 2016 and entitled "Method, Server, and Terminal for Automatically Extracting a Validity Period of a Driving License", which is incorporated herein by reference in its entirety.

TECHNICAL FIELD

This disclosure relates to data processing technology, and more particularly relates to a method, a device, a system, and a storage medium for automatically extracting a validity period of a driving license.

BACKGROUND

For auto insurance and auto insurance claims, the annual inspection validity period of a driving license is an important matter for audit. But extracting the annual inspection validity period of a driving license under natural circumstances faces many challenges. First, the intensity and uneven distribution of lighting may cause blurs or even shadows to appear on an image file of the driving license, both of which may result in great interference to the positioning of the target area. Second, the clarity of the driving license itself will also affect the extraction of the target area—e.g., some driving licenses, due to defacement, may be unable for even human eyes to distinguish at close observation. Third, sometimes multiple annual inspection records may be present on a driving license and they may not be arranged in the chronological order, requiring the user to identify all the records and pick out the latest annual inspection record.

SUMMARY

In view of the above, this application provides a method, a device, a system, and a storage medium for automatically extracting a validity period of a driving license, whereby the annual inspection validity period of a driving license can be extracted automatically.

A method of automatically extracting a validity period of a driving license is provided, the method including the following operations. An image file of a vehicle driving license is received. Candidate contour regions are extracted from within the image file according to a contour extraction rule, and then at least one candidate contour region containing an annual inspection validity period are selected from among the extracted candidate contour regions. Then all character contours are extracted from within each selected candidate contour region. A smallest circumscribed rectangle of each character contour in the selected candidate contour region is acquired, and image blocks bound by the acquired smallest circumscribed rectangles are divided one by one into individual single-character blocks. These single-character blocks then are sorted according to their respective positions in the selected candidate contour region. A corresponding character of each single-character block is recognized. Then a character string representing the annual inspection validity period is generated using the recognized characters based on the sorting. Finally time data in the character string is extracted and taken as the annual inspection validity period of the selected candidate contour region.

A device for automatically extracting a validity period of a driving license is also provided, the device including a storage device and a processor. The storage device is configured for storing a system for automatically extracting a validity period of a driving license. The processor is configured for invoking and executing the system to perform the following operations: receiving an image file of a vehicle driving license; extracting candidate contour regions from within the image file according to a contour extraction rule, and selecting at least one candidate contour region containing an annual inspection validity period from among the extracted candidate contour regions; extracting all character contours from within each selected candidate contour region; acquiring a smallest circumscribed rectangle of each character contour in the selected candidate contour region, and dividing image blocks bound by the acquired smallest circumscribed rectangles one by one into individual single-character blocks; sorting these single-character blocks according to their respective positions in the selected candidate contour region; recognizing a corresponding character of each single-character block; generating a character string representing the annual inspection validity period using the recognized characters based on the sorting; and extracting time data in the character string and taking the time data as the annual inspection validity period of the selected candidate contour region.

A system for automatically extracting a validity period of a driving license is further provided, the system including an image file acquisition module, a region selection module, a character extraction module, a character division module, a sorting module, a character recognition module, and a validity period determination module. The image file acquisition module is configured for acquiring an image file of a vehicle driving license. The region selection module is configured for extracting candidate contour regions from within the image file according to a contour extraction rule, and selecting at least one candidate contour region containing an annual inspection validity period from among the extracted candidate contour regions according to a selection and categorization rule. The character extraction module is configured for extracting all character contours from within each selected candidate contour region. The character division module is configured for acquiring a smallest circumscribed rectangle of each character contour in the selected candidate contour region, and dividing image blocks bound by the acquired smallest circumscribed rectangles one by one into individual single-character blocks. The sorting module is configured for sorting these single-character blocks according to their respective positions in the selected candidate contour region. The character recognition module is configured for recognizing a corresponding character of each single-character block. The validity period determination module is configured for generating a character string representing the annual inspection validity period using the recognized characters based on the sorting, and extracting time data in the character string when the character string is valid and taking the time data as the annual inspection validity period of the selected contour region.

A non-volatile storage medium storing computer-readable instructions is yet further provided, where the computer-readable instructions can be executed by one or more processors to perform the following operations: receiving an image file of a vehicle driving license; extracting candidate contour regions from the image file according to a contour extraction rule, and selecting from among the extracted candidate contour regions at least one candidate contour region containing an annual inspection validity period; extracting all character contours from within each selected candidate contour region; acquiring a smallest circumscribed rectangle of each character contour in the selected candidate contour region, and dividing image blocks bound by the acquired smallest circumscribed rectangles one by one into individual single-character blocks; sorting these single-character blocks according to their respective positions in the selected candidate contour region; recognizing a corresponding character of each single-character block; generating a character string representing the annual inspection validity period using the recognized characters based on the sorting; and extracting time data in the character string and taking the time data as the annual inspection validity period of the selected candidate contour region.

By the method, device, system, and storage medium for automatically extracting a driving license validity period that are provided by this application, the annual inspection validity period of a driving license can be extracted in an effective manner. In addition, when there are multiple annual inspection validity periods on the driving license, the latest annual inspection validity period can be further extracted, improving the work efficiency.

DETAILED DESCRIPTION OF THE INVENTION

In the present embodiment, the system 10 for automatically extracting a validity period of a driving license may be installed and run in an electronic device. The electronic device may be any device capable of achieving the technical purpose of this application, such as a server or a terminal device. In some embodiments, the electronic device may include a processor and a storage device. The processor may include a core unit and a control unit for interpreting computer instructions and processing the data in computer software. The storage device may include an internal memory and a non-volatile readable storage medium. The non-volatile readable storage medium can be used for storing an operating system, a database, as well as the system 10 for automatically extracting a validity period of a driving license, while the internal memory can furnish a cached operating environment for the operating system, the database, and the system for automatically extracting a validity period of a driving license. In some embodiments, the system 10 may include at least one computer-executable program instruction, which can be executed by one or more processors to perform the method of automatically extracting a validity period of a driving license that is provided by the embodiments of the application. For particular steps of the method, see the description that is to follow.

The non-volatile storage medium may include: a read-only memory (ROM), e.g., a programmable read-only memory (PROM), an erasable programmable read-only memory (EPROM), an electrically erasable read-only memory (EEPROM), or a flash memory; as well as a USB drive, a hard drive, a random access memory (RAM), a magnetic disk, an optical disc, or a variety of other media that are able to store program code.

As will be appreciated by those of skill in the art, the above description of electronic device configurations won't place limitations to the electronic device according to the solution of the disclosure. In particular, in addition to the processor and the storage device, the electronic device may further include other components or parts, e.g., a user interface, an input device, an output device, a network interface, to achieve the associated functions.

Figure 1:
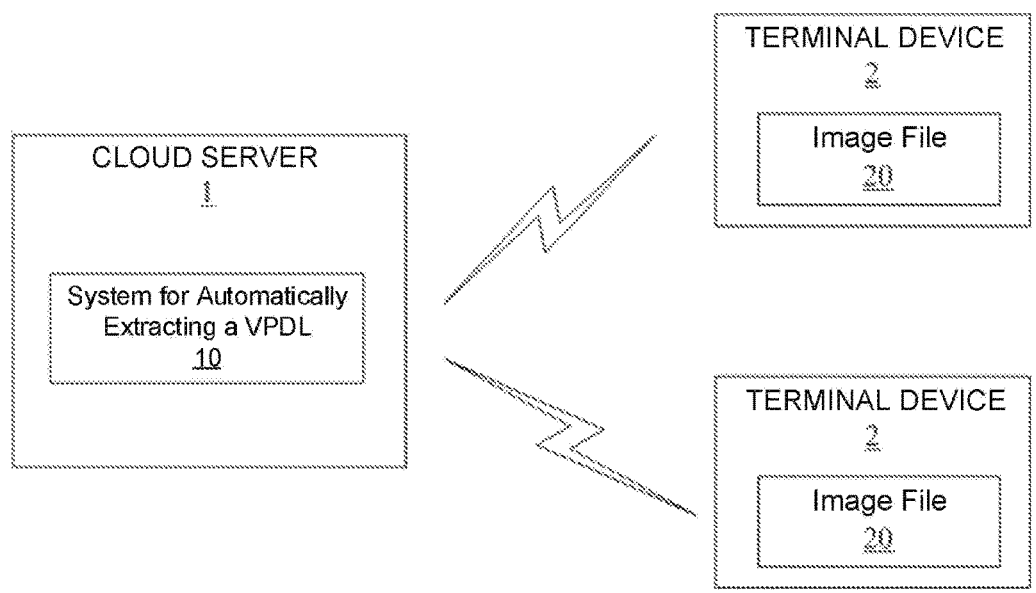
FIG. 1 is an illustrative schematic diagram of a hardware environment of a first exemplary embodiment of a system for automatically extracting a validity period of a driving license in accordance with the disclosure.

As described supra, in some embodiments, the device may be a server. As illustrated in FIG. 1, the server may be a cloud server 1. The cloud server 1 may be communicatively connected to one or more terminal devices 2 through a communication module (not shown). The terminal device 2 may be a personal computer, a smart phone, a tablet, or the like. The system 10 for automatically extracting a validity period of a driving license may include computer-executable program instruction code stored in a storage device. The processor executes the program instruction code to perform the following functions.

The cloud server 1 may receive an image file 20 of a vehicle driving license from the terminal device 2 and then extract candidate contour regions from within the image file 20. Further from among the extracted candidate contour regions, the cloud server 1 may select at least one candidate contour region containing an annual inspection validity period, and then extract character contours one by one from each selected candidate contour region. After all the character contours in the selected candidate contour region have been extracted, a smallest circumscribed rectangle of each character contour in the selected candidate contour region may be acquired, and image blocks bound by the acquired smallest circumscribed rectangles may then be divided one by one into individual single-character blocks. In this embodiment, these single-character blocks may be divided by the following method. The smallest circumscribed rectangles of the various character contours may be masked to the original image file 20—e.g., the character contour regions may remain unchanged, while the other regions can be set to a full-black background. Then the image block in which each character is located can be determined through the masked region defined by the smallest circumscribed rectangle of the character. As such, these image blocks can further be singled out separately.

Further, the system 10 may recognize the corresponding character of each single-character block in the selected candidate contour region, and then sort these single-character blocks of this selected candidate contour region based on the range of abscissas of every single-character block in the candidate contour region, e.g., sort them from left to right in an ascending order of their respective abscissas. Thus, the various recognized characters can be arranged according to the order of the corresponding single-character blocks so as to form a character string representative of the annual inspection validity period, and further the time part of the character string, such as the year and month, can be extracted as a textual representation of the annual inspection validity period presented in this candidate contour region. For example, an index position of the character "Year" may first be found, and the four characters preceding it may be captured as the year number. Then an index of the character "Month" may be found and the two characters prior to it may be extracted. Because sometimes the month number is only a single number, a determination is performed as to whether the first character of the extracted month is a number, and finally the extracted year and month portions will be assembled into a character string, thus forming an annual inspection validity period.

In one embodiment, if there is only one candidate contour region whose annual inspection validity period has been extracted, then this annual inspection validity period will be taken as the corresponding latest annual inspection validity period of the image file 20. In other embodiments, if there are multiple annual inspection validity periods extracted from the candidate contour regions, then the system 10 may compare the dates of the multiple annual inspection validity periods, and take the annual inspection validity period having the largest date as the corresponding latest annual inspection validity period of the image file 20. For example, the multiple annual inspection validity periods can be stored in a character string list, and then a time comparison function may be defined for comparing two dates, specifying that a "−1" is returned when the date on the left is greater than the date on the right, a "0" is returned when they are equal, and otherwise a "1" is be returned. Based on this comparison function, the time character strings in this list can be arranged in a descending order, and the first time character string element in the sequence will be taken as the current most recent annual inspection validity period of the driving license.

Figure 2:
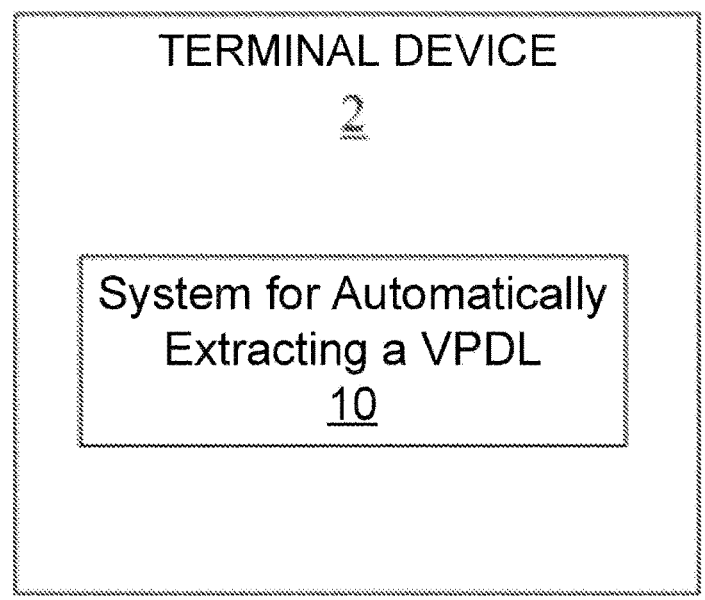
FIG. 2 is an illustrative schematic diagram of a hardware environment of a second exemplary embodiment of a system for automatically extracting a validity period of a driving license in accordance with the disclosure.

In other exemplary embodiments, the electronic device described supra can also be the terminal device 2 as illustrated in FIG. 2. The terminal device 2 may be a personal computer, a smart phone, a tablet, or the like. The terminal device 2 may be provided with an image pickup device for photographing a driving license. In this embodiment, the system 10 may include computer-executable program instruction code stored on a storage device of the terminal device 2. After receiving the image file acquired by the image pickup device, the processor of the terminal device 2 can execute this program instruction code to perform the method of automatically extracting a validity period of a driving license that is provided by this application.

Figure 3:
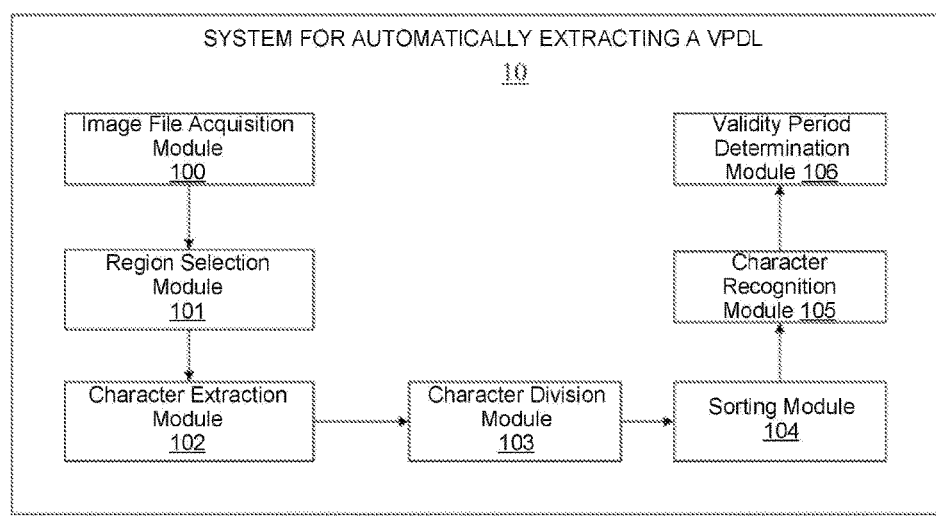
FIG. 3 is an illustrative block diagram of an exemplary embodiment of a system for automatically extracting a validity period of a driving license in accordance with the disclosure.

FIG. 3 shows an illustrative block diagram of an exemplary embodiment of a system for automatically extracting a validity period of a driving license according to the disclosure.

The program code of the system 10 for automatically extracting a validity period of a driving license can be divided into a plurality of functional modules based on their different functions. In an exemplary embodiment, the system 10 may include an image file acquisition module 100, a region selection module 101, a character extraction module 102, a character division module 103, a sorting module 104, a character recognition module 105, and a validity period determination module 106.

The image file acquisition module 100 is used for acquiring an image file 20 of a vehicle driving license from the terminal device 2. The terminal device 2 can acquire the image file of the vehicle driving license by means of scanning, photographing, or the like.

The region selection module 101 is used for extracting candidate contour regions from within the image file 20 according to a contour extraction rule, and selecting at least one candidate contour region containing an annual inspection validity period from among the extracted candidate contour regions according to a selection and categorization rule.

In this embodiment, the contour extraction rule may include, e.g., extracting contour regions containing various types of information from within the image file 20 using MSER (Maximized Stable Extreme Degree Region) algorithm, and then extracting the contour regions, each of which an aspect ratio lies in a predetermined range, as the candidate contour regions. It should be noted here that extracting the contour regions whose aspect ratios lie in the predetermined range can make it more accurate in positioning the regions where the target annual inspection validity periods are located. By observation, the format of a driving license is substantially fixed, and the aspect ratio of the annual inspection validity period region holds around 10:1. The predetermined range can be determined based on the relevant geometrical properties of the annual inspection validity period; that is, a slight fluctuation range, e.g., between 9.5:1 and 10.5:1, can be set allowing the regions whose aspect ratios lie in this range to be chosen as the annual inspection validity period regions. By the application of this heuristic rule, the number of candidate contour regions can be reduced by approximately 50%. In comparison, if not using the heuristic rule, many irrelevant contour regions may eventually be extracted—these regions will increase the difficulty and amount of computation in further processing.

Figure 6:
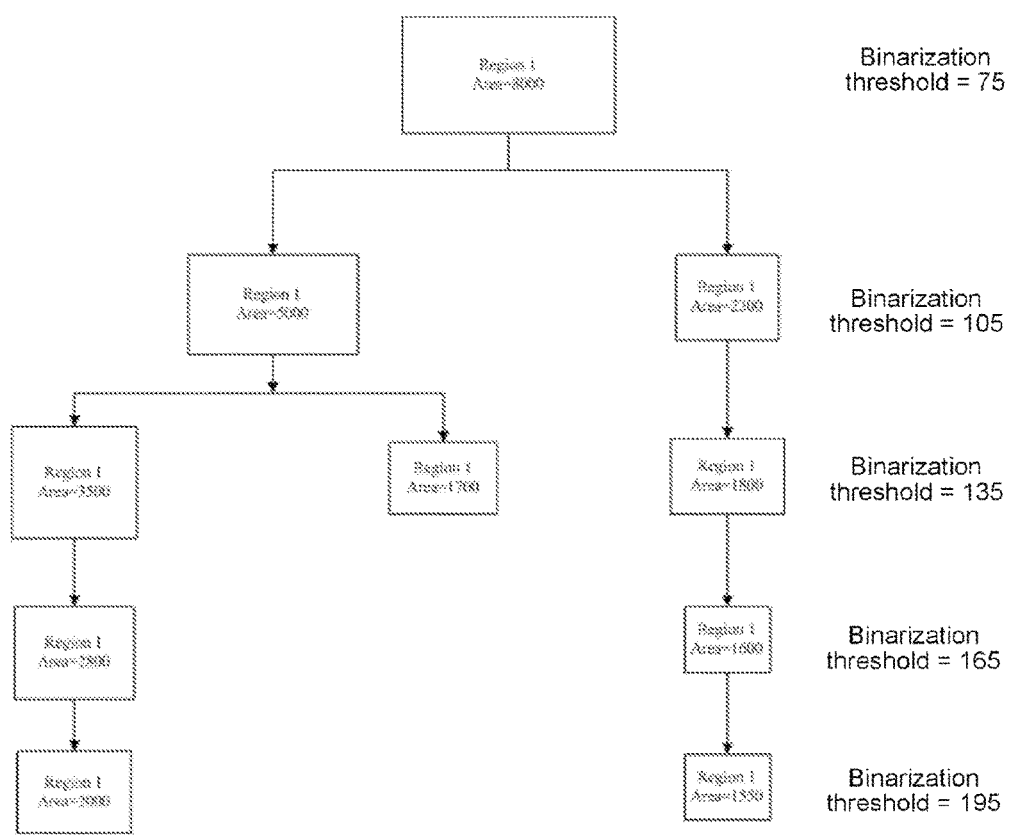
FIG. 6 illustrates a tree organization constructed from an extremal region.

The principle of the MSER algorithm may be as follows. The image file 20 is binarized using a series of equally graded grayscale thresholds (e.g., 75, 105, 135, 165, 195, . . . ), and a binary image having black and white regions can be acquired for each threshold, where an area whose shape remains stable over a relatively wide range of grayscale thresholds is a maximum stable extremal region. The extremal region (ER) can be defined as follows. If for a connected region (no discontinuity is present throughout the region), referred to as R (the initial letter of Region), the following inequality holds for any point Ri within the region and any point Rb at the boundary of the region, $\Phi(Ri) > \Phi(Rb)$, where $\Phi(Ri)$ represents a pixel value of the point Ri and $\Phi(Rb)$ represents a pixel value of the point Rb—which suggests an intuitive meaning that the pixel values of all the points within the region are always larger than those of the points on or outside the region boundary—then this region can be called an ER (extremal area, a region in a local range of the image formed by a set of pixels having larger pixel values than the surrounding areas). By varying the binarization threshold, a grayscale image can create many ERs. Depending on the magnitude of the binarization thresholds used to form the ERs, these ERs can be constructed as a tree organization, as illustrated in FIG. 6, referred to as an ER tree, where the ERs generated by each binarization threshold are located at a same level of the ER tree, while the binarization threshold of the next level (binarization thresholds at two adjacent levels differ by a certain value, e.g., 30)

may binarize an ER of the current level to form ERs of the next level. The ERs of the highest layer are formed by the smallest binarization threshold, and from top to bottom the binarization threshold is gradually increased until reaching the leaf nodes of the tree. In the tree-shaped structure formed by the ERs produced by multiple levels of binarization operations, each binarization threshold produces some ERs constituting one level of ERs. Then the threshold of the next level is used to again binarize the ERs produced by the current binarization threshold, producing the ERs at the tree's next level. Multi-level thresholds usually designate a relatively small threshold, e.g., 20~80, at the first level, and then gradually increase the threshold at increments of a certain amount, such as 30 in this example, where the increment should not be too large or too small and typically lies between 20 and 30. Sizes of the blocks illustrated in FIG. 6 reflect the sizes of their actual areas, where Area denotes the area of the corresponding region. Associations of the ERs in the tree may be as follows. Which are that the ERs produced by the binarization threshold of the same level are located at a same level, while the ERs produced by a relatively larger binarization threshold are located at the next level of the tree; that is, the ERs of the next level are the lower nodes of the current level of ERs. Through the paths in the tree, the ER tree can be traversed based on the ERs' generation relationships (upper and lower relations). By the ER tree, a stability value, variation, of an ER can be defined, and can be given by the following formula:

$$\text{variation}(ER_t) = \frac{|ER_t - \delta| - |ER_t + \delta|}{ER_t},$$

where $\delta$ is a parameter used to measure the number of nodes separating two ERs in the ER tree, and is set to 5 by default. $|ER_t|$ represents the area of the t-th ER, $|ER_t+\delta|$ represents the area of the ER separated from the t-th ER by a distance of $\delta$ nodes. Through a full path of an ER tree (accessed along the dependency relations between nodes in the tree), the ER with the smallest variation value is called the most stable ER, i.e., the region whose area is insensitive to threshold changes.

In this embodiment, the selection and categorization rule can be, for example, entering the extracted candidate contour regions to a trained first Deep ConvNet (deep convolutional neural network model). To ensure the selection accuracy, the first deep convolutional neural network model uses a 23-level model structure, including 1 input layer, 21 convolutional layers and 2 classification layers, where the input layer is not counted into the total number of layers. The first deep convolutional neural network model is trained by batches of contour regions with and without annual inspection validity periods. Then, the first Deep ConvNet can be used to determine a confidence level (i.e., probability) of a candidate contour region containing an annual inspection validity period. When the confidence level of the candidate contour region containing an annual inspection validity period is greater than a preset threshold (e.g., 85%), then this candidate contour region may be chosen as a candidate contour region containing an annual inspection validity period.

The character extraction module 102 is used for extracting character contours from within each selected candidate contour region.

In this embodiment, the character extraction module 102 may extract the various character contours by the following method: A, converting each candidate contour region into a single-channel grayscale image; B, binarizing the grayscale image using Otsu's threshold method, so as to compress a gray scale range of the grayscale image from 0~255 to a binary region such as 0-1, with most of the interference background removed; C, calling a contour extraction function, e.g., find Contours function, to extract all the contours within the binary image; D, singling out the contours each having a preset height and width, where the preset height may be, e.g., 33, while the preset width may be, e.g., 20; E, analyzing whether the number of the contours singled out is equal to a preset number, e.g., 10; and F, If the number of the contours singled out is unequal to the preset number, then incrementing or decrementing the preset height and/or the preset width by a preset amplitude, e.g., 1—e.g., adjusting the preset height to 34, and/or adjust the preset width to 21 and turning to the above step D.

The above steps D, E, F are intended to make character division more accurate. Normally, either a Chinese character or an English character in the annual inspection validity period would have roughly the same height, and the minimum width. Thus, by the two threshold conditions—the height and the width—irrelevant contours introduced during the image thresholding phase can be filtered out. Further, when the contours of the individual characters have been calculated, it is possible to determine whether the division is successful by counting the number of character contours in the annual inspection validity period region, because the number of characters in the annual inspection validity period region is usually fixed. If the number is incorrect, other character height thresholds such as 35 and width thresholds such as 22 may need to be tried out to segment into the correct number of character contours.

The character division module 103 is used for acquiring a smallest circumscribed rectangle of each character contour in the selected candidate contour region, and dividing image blocks bound by the acquired smallest circumscribed rectangles one by one into individual single-character blocks. For example, the smallest circumscribed rectangles of the various character contours can be masked to the original image, e.g., the character contour regions may remain unchanged, while the other regions can be set to a full-black background. Then the image block in which each character is located is determined through the masked region defined by the smallest circumscribed rectangle of the character. As such, these image blocks can further be singled out separately.

The sorting module 104 is used for sorting these single-character blocks according to their respective positions in the selected candidate contour region. More particularly, the sorting module 104 may sort the single-character blocks of the selected candidate contour region based on the range of abscissas of every single-character block in the selected candidate contour region, e.g., sort them from left to right in an ascending order of the abscissas.

The character recognition module 105 is used for recognizing a corresponding character of each single-character block according to a character recognition rule.

In this embodiment, the character recognition rule may include entering the various separate single-character blocks into a trained second Deep ConvNet, i.e., a second deep convolutional neural network model. For considerations of calculation time and computational resources, it has been found through many trials that the second Deep ConvNet will be able to ensure the recognition accuracy by using an 11-layer model structure. Accordingly, the second Deep ConvNet has 1 input layer, 10 convolutional layers and 1 classification layer, where the input layer is not counted to the total number of layers. The second Deep ConvNet is trained by using batches of various single-character blocks. The second Deep ConvNet can be used to recognize a corresponding character of each of the separate single-character blocks. The Deep ConvNet first extracts the classification features from within the input single-character image using the convolutional layers, and then passes the extracted classification features onto the last layer—MLP (Multiple Layer Perceptron) classification layer—for classification. The classification has a total of 76 categories, including: 10 invariant characters-8 Chinese characters and a pair of brackets: the annual inspection validity period expires at/year//month/; 25 English capital letters; 31 abbreviations of Chinese provinces. Therefore, when the classification layer outputs a number, the number will indicate a corresponding character category into which the current character will be classified.

The validity period determination module 106 is used for generating a character string representing the annual inspection validity period using the recognized characters based on the sorting, and extracting time data in the character string when the character string is valid and taking the time data as the annual inspection validity period of the contour region.

In this embodiment, the validity period determination module 106 may check whether the first 6 characters of the character string formed in the candidate contour region is a preset character string, e.g., "the annual inspection validity period expires at"; whether the eleventh character is a first preset character, e.g., "Year"; whether the fourth character to the last is a second preset character, e.g., "("; and whether the last character is a third preset character, e.g., ")", so as to determine whether the recognized character string is valid.

In this embodiment, the following method can be used to extract the time data in the character string. For example, an index position of the character "Year" may first be found, and the four characters preceding it can be captured as the year number. Then an index of the character "Month" may be found and the two characters prior to it may be extracted. Because sometimes the month number is only a single number, a determination is performed as to whether the extracted first character is a number. Finally the extracted year and month portions will be assembled into a character string. So the time part of the annual inspection validity period is extracted.

Figure 4:
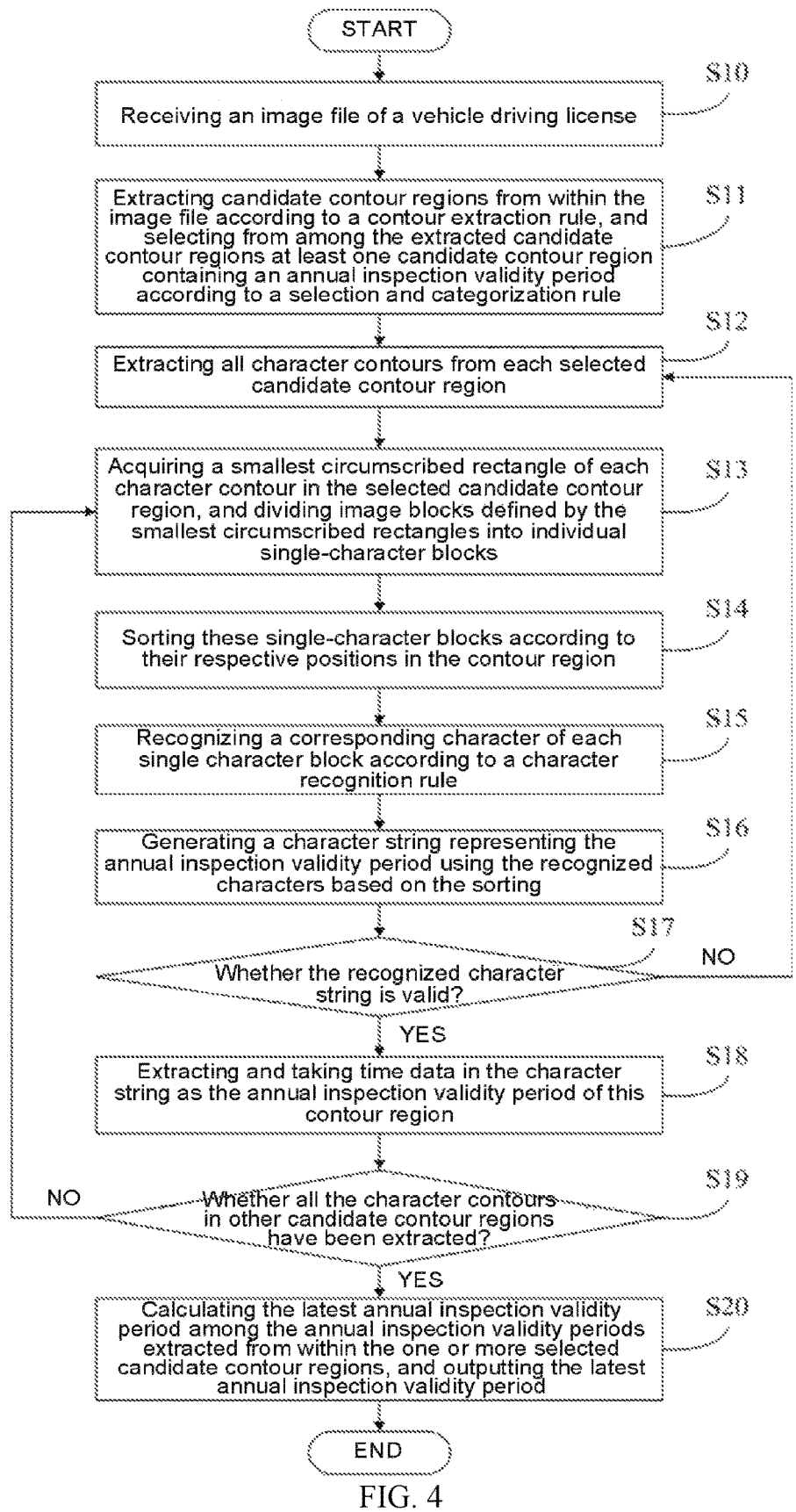
FIG. 4 is an illustrative flowchart of an exemplary embodiment of a method of automatically extracting a validity period of a driving license in accordance with the disclosure.

FIG. 4 is an illustrative flowchart of an exemplary embodiment of a method of automatically extracting a validity period of a driving license according to the disclosure. In this embodiment, the method of automatically extracting a validity period of a driving license will not be limited to the steps shown in the flowchart. In addition, of the steps shown in the flowchart, some steps can be omitted, and the order of these steps can be changed.

In step S10, the image file acquisition module 100 receives an image file 20 of a vehicle driving license from the terminal device 2.

In step S11, the region selection module 101 extracts candidate contour regions from within the image file 20 according to a contour extraction rule, and selects at least one candidate contour region containing an annual inspection validity period from among the extracted candidate contour regions according to a selection and categorization rule.

In this embodiment, the contour extraction rule may include, e.g., extracting contour regions containing various types of information from within the image file 20 using MSER (Maximized Stable Extreme Degree Region) algorithm, and then extracting the contour regions, each of which an aspect ratio lies in a predetermined range, as the candidate contour regions. It should be noted here that extracting the contour regions whose aspect ratios lie in the predetermined range can make it more accurate in positioning the regions where the target annual inspection validity periods are located. Through observation, the format of a driving license is substantially fixed, and the aspect ratio of the annual inspection validity period region holds around 10:1. The predetermined range can be determined based on the relevant geometrical properties of the annual inspection validity period; that is, a slight fluctuation range, e.g., between 9.5:1 and 10.5:1, can be set allowing the regions whose aspect ratios lie in this range to be chosen as the annual inspection validity period regions. By the application of this heuristic rule, the number of candidate contour regions can be reduced by approximately 50%. In comparison, if not using this heuristic rule, many irrelevant contour regions may eventually be extracted—these regions will increase the difficulty and amount of computation in further processing.

The principle of the MSER algorithm may be as follows. The image file 20 is binarized using a series of equally graded grayscale thresholds (e.g., 75, 105, 135, 165, 195, . . . ), and a binary image having black and white regions can be acquired for each threshold, where an area whose shape remains stable over a relatively wide range of grayscale thresholds is a maximum stable extremal region. The extremal region (ER) can be defined as follows. If for a connected region (no discontinuity is present throughout the region), referred to as R (the initial letter of Region), the following inequality holds for any point Ri within the region and any point Rb at the boundary of the region, $\Phi(Ri) > \Phi(Rb)$, where $\Phi(Ri)$ represents a pixel value of the point Ri and $\Phi(Rb)$ represents a pixel value of the point Rb—which suggests an intuitive meaning that the pixel values of all the points within the region are always larger than those of the points on or outside the boundary region—then this region can be called an ER (extremal area, a region in a local range of the image formed by a set of pixels having larger pixel values than the surrounding areas). By varying the binarization threshold, a grayscale image can generate many ERs. Depending on the magnitude of the binarization thresholds used to form the ERs, these ERs can be constructed as a tree organization, as illustrated in FIG. 6, referred to as an ER tree, where the ERs generated by each binarization threshold are located at a same level of the ER tree, while the binarization threshold of the next level (binarization thresholds at two adjacent levels differ by a certain value, e.g., 30) may binarize the ER of the current level to form the ER of the next level. The ERs of the highest layer are formed by the smallest binarization threshold, and from top to bottom the binarization threshold is gradually increased until reaching the leaf nodes of the tree. In the tree-shaped structure formed by the ERs produced by multiple levels of binarization operations, each binarization threshold produces some ERs (extremal regions) constituting one level of ERs. Then the threshold of the next level is used to again binarize the ERs produced by the current binarization threshold, producing the ERs at the tree's next level. Multi-level thresholds usually designate a relatively small threshold, e.g., 20~80, at the first level, and then gradually increase the threshold at increments of a certain amount, such as 30 in this example, where the increment should not be too large or too small and typically between 20 and 30. Sizes of the blocks illustrated in FIG. 6 reflect the sizes of their actual areas, where Area denotes the area of the corresponding region. Associations of the ERs in the tree may be as follows. Which are that the ERs produced by the binarization threshold of the same level are located at a same level, while the ERs produced by a relatively larger binarization threshold are located at the next level of the tree, that is, the ERs of the next level are the lower nodes of the current level of ERs. Through the paths in the tree: the ER tree can be traversed based on the ERs' generation relationships (upper and lower relations). By the ER tree, a stability value, variation, of an ER can be defined, and can be obtained by the following formula:

$$\text{variation}(ER_t) = \frac{|ER_t - \delta| - |ER_t + \delta|}{ER_t},$$

where $\delta$ is a parameter used to measure the number of nodes separating two ERs in the ER tree, and is set to 5 by default. $|ER_t|$ represents the area of the t-th ER, $|ER_t+\delta|$ represents the area of the ER separated from the t-th ER by a distance of $\delta$ nodes. Through a full path of an ER tree (accessed along the dependency relations between nodes in the tree), the ER with the smallest variation value is called the most stable ER, i.e., the region whose area is insensitive to threshold changes.

In this embodiment, the selection and categorization rule can be, for example, entering the extracted candidate contour regions to a trained first Deep ConvNet (deep convolutional neural network model). To ensure the selection accuracy, the first deep convolutional neural network model uses a 23-level model structure, including 1 input layer, 21 convolutional layers and 2 classification layers, where the input layer is not counted into the total number of layers. The first deep convolutional neural network model is trained by batches of contour regions with and without annual inspection validity periods. Then, the first Deep ConvNet can be used to determine a confidence level (i.e., probability) of a candidate contour region containing an annual inspection validity period. When the confidence level of the candidate contour region containing an annual inspection validity period is greater than a preset threshold (e.g., 85%), then this candidate contour region may be chosen as a candidate contour region containing an annual inspection validity period.

In step S12, the character extraction module 102 extracts character contours from within each selected candidate contour region. For details of this step, see the following description in connection with FIG. 5.

In step S13, the character division module 103 acquires a smallest circumscribed rectangle of each character contour in the selected candidate contour region, and divides image blocks bound by the acquired smallest circumscribed rectangles one by one into individual single-character blocks.

In this embodiment, the character division module 103 may mask the smallest circumscribed rectangles of the various character contour to the original image, e.g., the character contour regions may remain unchanged, while the other regions can be set to a full-black background. Then the character division module 103 may determine the image block where each character is located through the masked region defined by the smallest circumscribed rectangle of the character, and further single out these image blocks separately.

In step S14, the sorting module 104 sorts these single-character blocks according to their respective positions in the selected candidate contour region.

More particularly, the sorting module 104 may sort the single-character blocks of the selected candidate contour region based on the range of abscissas of every single-character block in the selected candidate contour region, e.g., sort them from left to right in an ascending order of the abscissas.

In step S15, the character recognition module 105 recognizes a corresponding character of each single-character block according to a character recognition rule.

In this embodiment, the character recognition rule may include entering the various separate single-character blocks into a trained second Deep ConvNet, i.e., a second deep convolutional neural network model. For considerations of calculation time and computational resources, it has been found through many trials that the second Deep ConvNet will be able to ensure the recognition accuracy by using an 11-layer model structure. Accordingly, the second Deep ConvNet has 1 input layer, 10 convolutional layers and 1 classification layer, where the input layer is not counted to the total number of layers. The second Deep ConvNet is trained by using batches of various single-character blocks. The second Deep ConvNet can be used to recognize a corresponding character of each of the separate single-character blocks. The Deep ConvNet first extracts the classification features from within the input single-character image using the convolutional layers, and then passes the extracted classification features onto the last layer—MLP (Multiple Layer Perceptron) classification layer—for classification. The classification has a total of 76 categories, including: 10 invariant characters-8 Chinese characters and a pair of brackets: the annual inspection validity period expires at/year/month/; 25 English capital letters; 31 abbreviations of Chinese provinces. Therefore, when the classification layer outputs a number, the number will indicate a corresponding character category into which the current character will be classified.

In step S16, the validity period determination module 106 generates a character string representing the annual inspection validity period using the recognized characters based on the sorting.

In step S17, the validity period determination module 106 further determines whether the recognized character string is valid.

In this embodiment, the validity period determination module 106 may check whether the first 6 characters of the character string formed in the candidate contour region is a preset character string, e.g., "the annual inspection validity period expires at"; whether the eleventh character is a first preset character, e.g., Year"; whether the fourth character to the last is a second preset character, e.g., "("; and whether the last character is a third preset character, e.g., ")", so as to determine whether the recognized character string is valid.

When the recognized character string is invalid, the character extraction module 102 may increment or decrement the preset height and/or width by a preset amplitude (e.g., 1), and cause the flow to return to the above step S12.

When the recognized character string is valid, the flow may carry out the following step S18.

In step S18, the validity period determination module 106 extracts the time data in the character string and takes the time data as the annual inspection validity period of the candidate contour region.

In this embodiment, the following method can be used to extract the time data in the character string. For example, an index position of the character "Year" may first be found, and the four characters preceding it will be captured as the year number. Then an index of the character "Month" may be found and the two characters prior to it may be extracted. Because sometimes the month number is only a single number, a determination is performed as to whether the extracted first character is a number. Finally the extracted year and month portions will be assembled into a character string. So the time part of the annual inspection validity period is extracted.

In step S19, the character division module 103 further determines whether there are other selected candidate contour regions each of which all the character contours have been extracted. If there are other contour regions of which all the character contours have been extracted, then the above step S13 is returned to and performed. If there is no other contour region of which all the character contours have been extracted, then the following step S20 is performed.

In step S20, the validity period determination module 106 calculates the latest annual inspection validity period among the annual inspection validity periods extracted from the one or more selected candidate contour regions, and outputs the latest annual inspection validity period.

In one embodiment, if there is only one candidate contour region whose annual inspection validity period has been extracted, then this annual inspection validity period will be taken as the corresponding latest annual inspection validity period of the image.

In another embodiment, if there are multiple selected candidate contour regions whose annual inspection validity periods have extracted, then the validity period determination module 106 may compare the dates of the multiple annual inspection validity periods, and further take the annual inspection validity period having the largest date, i.e., the latest date, e.g., the date "December 2015" which is larger than "November 2014", as the corresponding latest annual inspection validity period of the image. For example, the validity period determination module 106 may store the multiple annual inspection validity periods into a character string list, and then define a time comparison function for comparing two dates, specifying that a "−1" is returned when the date on the left is greater than the date on the right, a "0" is returned when they are equal, and otherwise a "1" is returned. Then based on this comparison function, the time character strings of this list can be arranged in a descending order, and the first time character string element in the sequence will be taken as the current most recent annual inspection validity period of the driving license.

Figure 5:
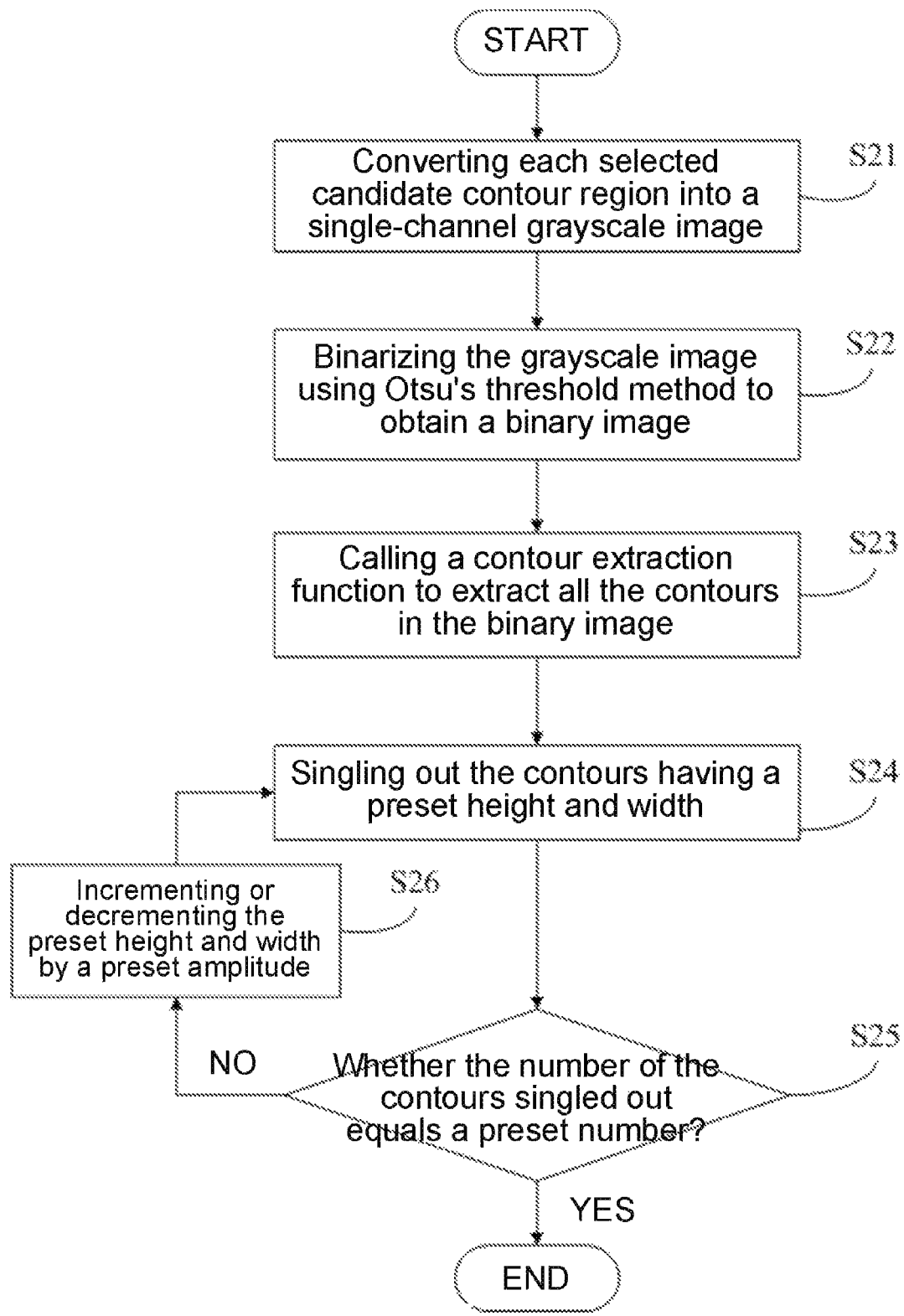
FIG. 5 is a detailed flowchart illustrating the extraction of character contours from within each selected candidate contour region in the exemplary embodiment of the method of automatically extracting a validity period of a driving license illustrated in FIG. 4.

FIG. 5 is a detailed flowchart illustrating the step S12 shown in FIG. 4, i.e., the extraction of various character contours from within a selected candidate contour region. In this embodiment the method of automatically extracting a validity period of a driving license will not be limited to the steps shown in the flowchart. In addition, of the steps shown in the flowchart, some steps can be omitted, and the order of the steps can be changed.

In step S21, the character extraction module 102 converts each selected character contour to a single-channel grayscale image.

In step S22, the character extraction module 102 binarizes the grayscale image using Otsu's threshold method to compress a gray scale range of the grayscale image from 0~255 to a binary region such as 0-1 to obtain a binary image, with most of the interference background removed.

In step S23, the character extraction module 102 calls a contour extraction function to extract all the contours within the binary image. For example, the contour extraction function may be find Contours function.

In step S24, the character extraction module 102 singles out the contours each having a preset height and width. The preset height may be, e.g., 33, while the preset width may be, e.g., 20.

In step S25, the character extraction module 102 analyzes whether the number of the contours singled out is equal to a preset number, e.g., 10. If the number of the contours singled out is unequal to the preset number, then step S26 is performed.

In step S26, the character extraction module 102 increments or decrements the preset height and/or width by a preset amplitude (e.g., 1)—e.g., the preset height may be adjusted to 34, and/or the preset width may be adjusted to 21, and then the above step S24 is turned to and performed.

If the number of the contours singled out is equal to the preset number, then the flow ends.

The above steps S24~S26 are intended to make character division more accurate. Normally, either a Chinese character or an English character in the annual inspection validity period would have roughly the same height, and the minimum width. Thus, by the two threshold conditions—the height and the width—the irrelevant contours introduced during the image thresholding phase can be filtered out. Further, when the contours of the individual characters have been calculated, it is possible to determine whether the division is successful by counting the number of character contours in the annual inspection validity period region, because the number of characters in the annual inspection validity period region is usually fixed. If the number is incorrect, other character height thresholds such as 35 and width thresholds such as 22 may need to be tried out to segment into the correct number of character contours.

It should be noted that although in the above-described embodiments the image file of the vehicle driving license is provided by the terminal device 2 by way of example, those of skill in the art will appreciate that in other embodiments the image file can also be obtained through other means. For example, the image file can be stored on a cloud server or cloud database, and so the image file can be transmitted through the network when the image file is needed. Of course, in other embodiments these image files may also be stored in a separate storage device—such as a USB flash drive—which can be read when it is desired to obtain the image file.

It will be appreciated that in the above embodiments the sequence numbers of the various steps do not represent an order in which these steps are performed. Actually, the order in which the various steps are performed should be determined by their functions and the intrinsic logic. Thus, the foregoing numbering will not constitute any limitation to the implementation of the various embodiments of the disclosure.

Those of ordinary skill in the art will appreciate that some or all steps of the foregoing embodiments can be implemented by hardware, or can also be implemented by instructing the relevant hardware using programs. Programs can be stored in a computer-readable storage medium, such as a read-only memory, a magnetic disk, an optical disc, etc.

Note the above embodiments are merely illustrative of the technical aspects of the disclosure and are not restrictive. Although the disclosure has been described in detail with reference to some exemplary embodiments, it will be understood by those of ordinary skill in the art that various modifications or equivalent substitutions to the technical aspects of the disclosure can be contemplated without departing from the spirit and scope of the technical solutions of the disclosure.

What is claimed is:

1. A method of automatically extracting a validity period of a driving license, the method comprising:
   receiving an image file of a vehicle driving license;
   extracting candidate contour regions from within the image file according to a contour extraction rule, and selecting from among the extracted candidate contour regions at least one candidate contour region containing an annual inspection validity period;
   extracting all character contours from within each selected candidate contour region;
   acquiring a smallest circumscribed rectangle of each character contour in the selected candidate contour region, and dividing image blocks bound by the acquired smallest circumscribed rectangles one by one into individual single-character blocks;
   sorting these single-character blocks according to their respective positions in the selected candidate contour region;
   recognizing a corresponding character of each single-character block;
   generating a character string representing the annual inspection validity period using the recognized characters based on the sorting; and
   extracting time data in the character string and taking the time data as the annual inspection validity period of the selected candidate contour region.

2. The method of claim 1, wherein the contour extraction rule comprises:
   extracting contour regions containing various types of information from within the image file using maximum stable extremal region (MSER) scheme; and
   extracting, from among the extracted contour regions, the contour regions each having an aspect ratio lying within a predetermined range, as the candidate contour regions.

3. The method of claim 1, wherein the extracting all the character contours from within each selected candidate contour region comprises:
   converting each selected candidate contour region to a single-channel grayscale image;
   binarizing the grayscale image using Otsu's threshold method to obtain a binary image;
   calling a contour extraction function to extract all the contours in the binary image;
   singling out the contours each having a preset height and a preset width;
   analyzing whether the number of the contours singled out is equal to a preset number; and
   incrementing or decrementing the preset height and/or preset width by a preset amplitude if the number of the contours singled out is unequal to the preset number, and returning to singling out the contours each having a preset height and a preset width.

4. The method of claim 1, wherein the dividing the image blocks bound by the acquired smallest circumscribed rectangles one by one into individual single-character blocks comprises:
   masking the smallest circumscribed rectangles of the character contours to the original image file; and
   determining the image block in which each character is located through a masked region defined by the smallest circumscribed rectangle of the character, and singling out the image block.

5. A device for automatically extracting a validity period of a driving license, the device comprising a storage device and a processor, wherein the storage device is configured for storing a system for automatically extracting a validity period of a driving license; the processor is configured for executing the system to perform the following operations:
   receiving an image file of a vehicle driving license;
   extracting candidate contour regions from within the image file according to a contour extraction rule, and selecting from among the extracted candidate contour regions at least one candidate contour region containing an annual inspection validity period;
   extracting all character contours from within each selected candidate contour region;
   acquiring a smallest circumscribed rectangle of each character contour in the selected candidate contour region, and dividing image blocks bound by the acquired smallest circumscribed rectangles one by one into individual single-character blocks;
   sorting these single-character blocks according to their respective positions in the selected candidate contour region;
   recognizing a corresponding character of each single-character block;
   generating a character string representing the annual inspection validity period using the recognized characters based on the sorting; and
   extracting time data in the character string and taking the time data as the annual inspection validity period of the selected candidate contour region.

6. The device of claim 5, wherein the contour extraction rule comprises:
   extracting contour regions containing various types of information from within the image file using maximum stable extremal region (MSER) scheme; and
   extracting, from among the extracted contour regions, the contour regions each having an aspect ratio lying within a predetermined range, as the candidate contour regions.

7. The device of claim 5, wherein the extracting all the character contours from within each selected candidate contour region comprises:
   converting the selected candidate contour region to a single-channel grayscale image;
   binarizing the grayscale image using Otsu's threshold method to obtain a binary image;
   calling a contour extraction function to extract all the contours in the binary image;
   singling out the contours each having a preset height and a preset width;
   analyzing whether the number of the contours singled out is equal to a preset number; and
   incrementing or decrementing the preset height and/or preset width by a preset amplitude if the number of the contours singled out is unequal to the preset number, and returning to singling out the contours each having a preset height and a preset width.

8. The device of claim 5, wherein the dividing the image blocks bound by the acquired smallest circumscribed rectangles one by one into individual single-character blocks comprises:
   masking the smallest circumscribed rectangles of the character contours to the original image file; and
   determining the image block in which each character is located through a masked region defined by the smallest circumscribed rectangle of the character, and singling out the image block.

9. A non-volatile storage medium storing computer-readable instructions that, when executed by one or more processors, perform the following operations:

receiving an image file of a vehicle driving license;

extracting candidate contour regions from the image file according to a contour extraction rule, and selecting from among the extracted candidate contour regions at least one candidate contour region containing an annual inspection validity period;

extracting all character contours from within each selected candidate contour region;

acquiring a smallest circumscribed rectangle of each character contour in the selected candidate contour region, and dividing image blocks bound by the acquired smallest circumscribed rectangles one by one into individual single-character blocks;

sorting these single-character blocks according to their respective positions in the selected candidate contour region;

recognizing a corresponding character of each single-character block;

generating a character string representing the annual inspection validity period using the recognized characters based on the sorting; and extracting time data in the character string and taking the time data as the annual inspection validity period of the selected candidate contour region.

10. The non-volatile storage medium of claim 9, wherein the contour extraction rule comprises:

extracting contour regions containing various types of information from within the image file using maximum stable extremal region (MSER) scheme; and extracting, from among the extracted contour regions, the contour regions each having an aspect ratio lying within a predetermined range, as the candidate contour regions.

11. The non-volatile storage medium of claim 9, wherein the extracting all the character contours from each selected candidate contour region comprises:

converting each selected candidate contour region to a single-channel grayscale image;

binarizing the grayscale image using Otsu's threshold method to obtain a binary image;

calling a contour extraction function to extract all the contours in the binary image;

singling out the contours each having a preset height and a preset width;

analyzing whether the number of the contours singled out is equal to a preset number; and incrementing or decrementing the preset height and/or preset width by a preset amplitude if the number of the contours singled out is unequal to the preset number, and returning to singling out the contours each having a preset height and a preset width.

12. The non-volatile storage medium of claim 9, wherein the dividing the image blocks bound by the acquired smallest circumscribed rectangles one by one into individual single-character blocks comprises:

masking the smallest circumscribed rectangles of the character contours to the original image file; and determining the image block in which each character is located through a masked region defined by the smallest circumscribed rectangle of the character, and singling out the image block.

13. The method of claim 2, wherein the predetermined range is between 9.5:1 and 10.5:1.

14. The method of claim 1, wherein the selecting the at least one candidate contour region comprises:

entering the extracted candidate contour regions to a trained first deep convolutional neural network (CNN) model;

determining a confidence level of each extracted candidate contour region containing an annual inspection validity period; and choosing the extracted candidate contour region as a candidate contour region containing an annual inspection validity period when the confidence level of the extracted candidate contour region is greater than a predetermined threshold.

15. The method of claim 14, wherein the first deep CNN model uses a 23-level model structure comprising 1 input layer, 21 convolutional layers and 2 classification layers, where the input layer is not counted into the total number of layers, and the first deep CNN model is trained by batches of contour regions with and without annual inspection validity periods.

16. The method of claim 1, wherein the recognizing a corresponding character of each single-character block comprises:

entering the single-character blocks into a trained second deep convolutional neural network (CNN) model; and recognizing the corresponding character of each single-character block using the trained second deep CNN model.

17. The method of claim 16, wherein the second deep CNN model comprises 1 input layer, 10 convolutional layers and 1 classification layer, where the input layer is not counted into the total number of layers, and the second deep CNN model is trained by using batches of various single-character blocks.

18. The device of claim 5, wherein the selecting the at least one candidate contour region comprises;

entering the extracted candidate contour regions to a trained first deep convolutional neural network (CNN) model;

determining a confidence level of each extracted candidate contour region containing an annual inspection validity period; and choosing the extracted candidate contour region as a candidate contour region containing an annual inspection validity period, when the confidence level of the extracted candidate contour region is greater than a predetermined threshold.

19. The device of claim 5, wherein the recognizing a corresponding character of each single-character block comprises:

entering the single-character blocks into a trained second deep convolutional neural network (CNN) model; and recognizing the corresponding character of each single-character block using the trained second deep CNN model.

20. The non-volatile storage medium of claim 9, wherein the selecting the at least one candidate contour region comprises:

entering the extracted candidate contour regions to a trained first deep convolutional neural network (CNN) model;

determining a confidence level of each extracted candidate contour region containing an annual inspection validity period; and choosing the extracted candidate contour region as a candidate contour region containing an annual inspection validity period, when the confidence level of the extracted candidate contour region is greater than a predetermined threshold.

* * * * *